United States Patent
Matulik et al.

(10) Patent No.: US 7,269,704 B2
(45) Date of Patent: Sep. 11, 2007

(54) METHOD AND APPARATUS FOR REDUCING SYSTEM INACTIVITY DURING TIME DATA FLOAT DELAY AND EXTERNAL MEMORY WRITE

(75) Inventors: Eric Matulik, Meyreuil (FR); Nicolas Rescanieres, Villenevue Loubet (FR); Anne Lafage, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 159 days.

(21) Appl. No.: 11/128,109

(22) Filed: May 11, 2005

(65) Prior Publication Data

US 2006/0224848 A1    Oct. 5, 2006

(30) Foreign Application Priority Data

Mar. 30, 2005  (FR) .................. 05 03089

(51) Int. Cl.
*G06F 12/00* (2006.01)
*G06F 13/00* (2006.01)

(52) U.S. Cl. .............. 711/167; 711/169; 710/3
(58) Field of Classification Search ............ None
See application file for complete search history.

(56) References Cited

U.S. PATENT DOCUMENTS

| | | | | |
|---|---|---|---|---|
| 4,231,091 A * | 10/1980 | Motz | ............... | 701/102 |
| 5,379,394 A | 1/1995 | Goto | ............... | 395/425 |
| 5,448,744 A | 9/1995 | Eifert et al. | ............... | 395/800 |
| 5,651,138 A * | 7/1997 | Le et al. | ............... | 711/154 |
| 5,675,749 A | 10/1997 | Hartvigsen et al. | ............... | 395/308 |
| 5,680,643 A | 10/1997 | Flynn | ............... | 395/855 |
| 5,822,779 A | 10/1998 | Intrater et al. | ............... | 711/168 |
| 5,850,541 A | 12/1998 | Sugimoto | ............... | 395/560 |
| 6,097,218 A * | 8/2000 | Callicott et al. | ............... | 326/82 |
| 6,223,265 B1 | 4/2001 | Kawasaki et al. | ............... | 711/167 |
| 6,356,987 B1 | 3/2002 | Aulas | ............... | 711/167 |
| 6,496,890 B1 | 12/2002 | Azevedo et al. | ............... | 710/110 |
| 6,519,666 B1 | 2/2003 | Azevedo et al. | ............... | 710/120 |
| 2001/0018724 A1 | 8/2001 | Sukegawa | ............... | 711/103 |

* cited by examiner

*Primary Examiner*—Matthew Kim
*Assistant Examiner*—Michael Krofcheck
(74) *Attorney, Agent, or Firm*—Sierra Patent Group, Ltd.

(57) ABSTRACT

The invention comprises a system for reducing inactive periods in an integrated circuit. The integrated circuit is coupled to an external peripheral by an external data bus. The integrated circuit has a processor coupled to an internal data bus. The system comprises the following. An external bus circuit is coupled to the internal and external data busses. The bus interface circuit is configured to receive read and write signals for data request data. In response, the bus interfaces circuit transmits a wait signal until data from the external peripheral is available on the internal data bus. The wait signal indicates that the external and internal data busses are not available for other purposes. After the processor has received or transmits the data, the bus interface circuit stops transmitting the wait signal and transmits a busy signal. The busy signal indicates that the internal data bus is available and the external data bus is not available for other purposes.

17 Claims, 11 Drawing Sheets

METHOD AND APPARATUS FOR REDUCING SYSTEM INACTIVITY DURING TIME DATA FLOAT DELAY AND EXTERNAL MEMORY WRITE

CROSS-REFERENCE TO RELATED APPLICATION

This application claims priority to French Application Serial Number 05 03089, filed Mar. 30, 2005, which is hereby incorporated by reference as if set forth herein.

BACKGROUND OF THE INVENTION

The invention relates generally to system resource management and specifically to an external data bus interface designed to allow internal data bus usage while the external data bus is engaged.

DESCRIPTION OF THE RELATED ART

Figure 1:
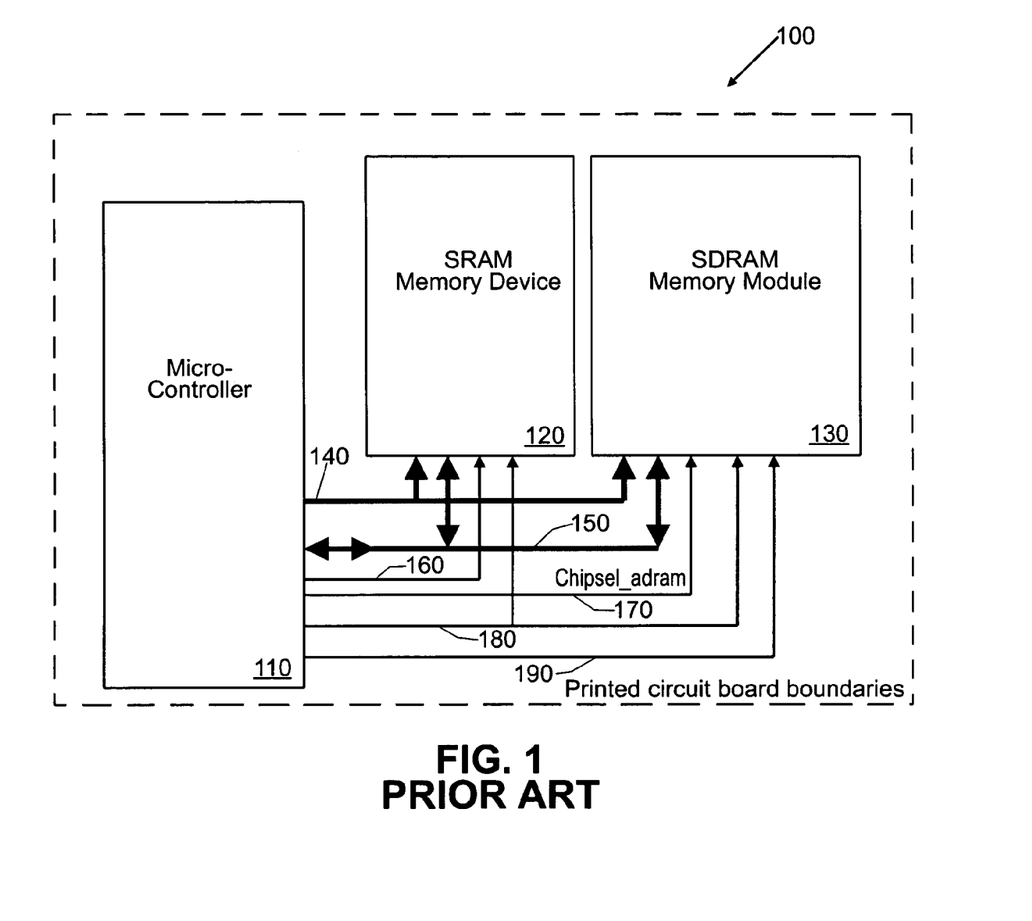
FIG. 1 is a schematic illustrating a prior art microcontroller with external memory.

FIG. 1 is a schematic illustrating a prior art microcontroller with external memory. Printed circuit board 100 includes microcontroller 110 connected to external memory. Microcontroller 110 has different functions and an internal memory, however the internal memory is not sufficiently large for all the intended purposes of microcontroller 110.

Static random access memory (SRAM) 120 and synchronous dynamic random access memory (SDRAM) 130 connect to microcontroller 110 and provide greater storage than available in microcontroller 110. Address bus 140 provides memory address locations from microcontroller 110 to SRAM 120 and SDRAM 130. External data bus 150 is a bidirectional data bus that enables data to be read from or written to SRAM 120 and SDRAM 130. Chip select 160 activates SRAM 120 when required by microcontroller 110. Chip select 170 activates SDRAM 130 when required by microcontroller 110. Read/write line 180 connects to SRAM 120 and SDRAM 130. Clock line 190 carries a clock signal to synchronize SDRAM 130 with microcontroller 110. Other lines and signals between microcontroller 110 and SRAM 120 and SDRAM 130 are not shown but know to those skilled in the art.

Figure 2:
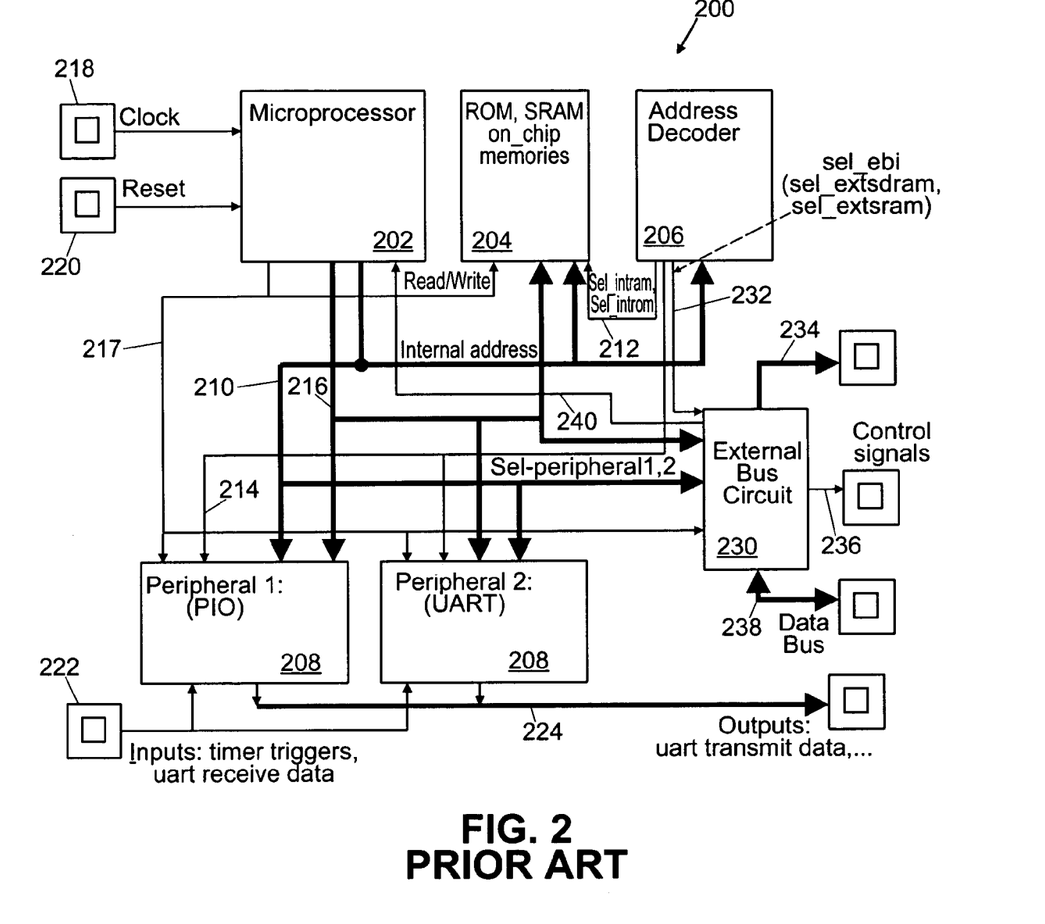
FIG. 2 is a schematic illustrating a prior art microcontroller with external bus circuit.

FIG. 2 is a schematic illustrating a prior art microcontroller with external data bus interface. A microcontroller generally includes a microprocessor, memory, a peripheral module that provides communication, for example Universal Asynchronous Receiver/Transmitter (UART), SPI, and USB, and an interrupt controller. Internal memory for a microcontroller is often small, but faster than external memory. Data that requires fast access time and is small enough may be held in internal memory. For external memory, the microcontroller uses an external bus circuit to translate the system bus waveform protocol into the targeted memory waveform protocol. When the external memory requires more than one clock cycle to be accessed, a wait signal is sent to the microprocessor indicating no further access on the data bus is possible. Once the external memory completes its procedure, the wait signal ends and further access to the data bus is possible. One example of microcontroller 110 is illustrated in FIG. 2 as microcontroller 200.

Microcontroller 200 includes microprocessor 202 coupled to memory 204. Address decoder 206 receives and decodes addresses from microprocessor 202 for memory 204 and peripherals 208. Address decoder 206, peripherals 208, and memory 204 receive addresses on address bus 210 while address decoder 206 transmits select information on memory select 212 and peripheral select 214. Data is transmitted between microprocessor 202, memory 204, and peripherals 208 on internal data bus 216, which is a data bus. A read or a write signal is transmitted between microprocessor 202, memory 204, and peripherals 208 on read/write line 217. Microcontroller 200 receives clock signal 218 and reset signal 220. Input 222 includes, for example, timer triggers and UART input data while output 224 includes, for example, UART transmitter output data. Peripherals 208 may be functional logic, for example UART, crypto-processing, and/or digital filtering.

When microcontroller 110 needs to access SRAM 120 or SDRAM 130, microprocessor 202 sends the address to address decoder 206 and external bus circuit 230. Address decoder 206 determines that the address is external to microcontroller 200 and sends a select signal to external bus circuit 230 along select line 232, indicating whether to access the SRAM or SDRAM. External bus circuit 230 receives a read/write signal on read/write line 217.

External bus circuit 230 processes the address and sends the address along address bus 234 to the memory. Control signals on control signal line 236 are also transmitted. Once the memory processes the request, data is transmitted along external data bus 238, which is also external data bus 150 from FIG. 1.

During an external memory write, data is sent from microprocessor 202 along internal data bus 216 to external bus circuit 230. Then the data is transmitted on external data bus 238. If the external memory takes more than one clock cycle to receive or store the data from external data bus 238, external bus circuit 230 sends a wait signal on wait line 240. Until the wait signal is stopped, microprocessor 202 will not send more information on internal data bus 216.

During an external memory read, data is sent from external memory along external data bus 238 to external bus circuit 230 and then to microprocessor 202 along internal data bus 216. Once the data has been received, external bus circuit releases external data bus 238. A wait signal along wait line 240 is sent to microprocessor 202 until external data bus 238 and internal data bus 216 are released.

Figure 3:
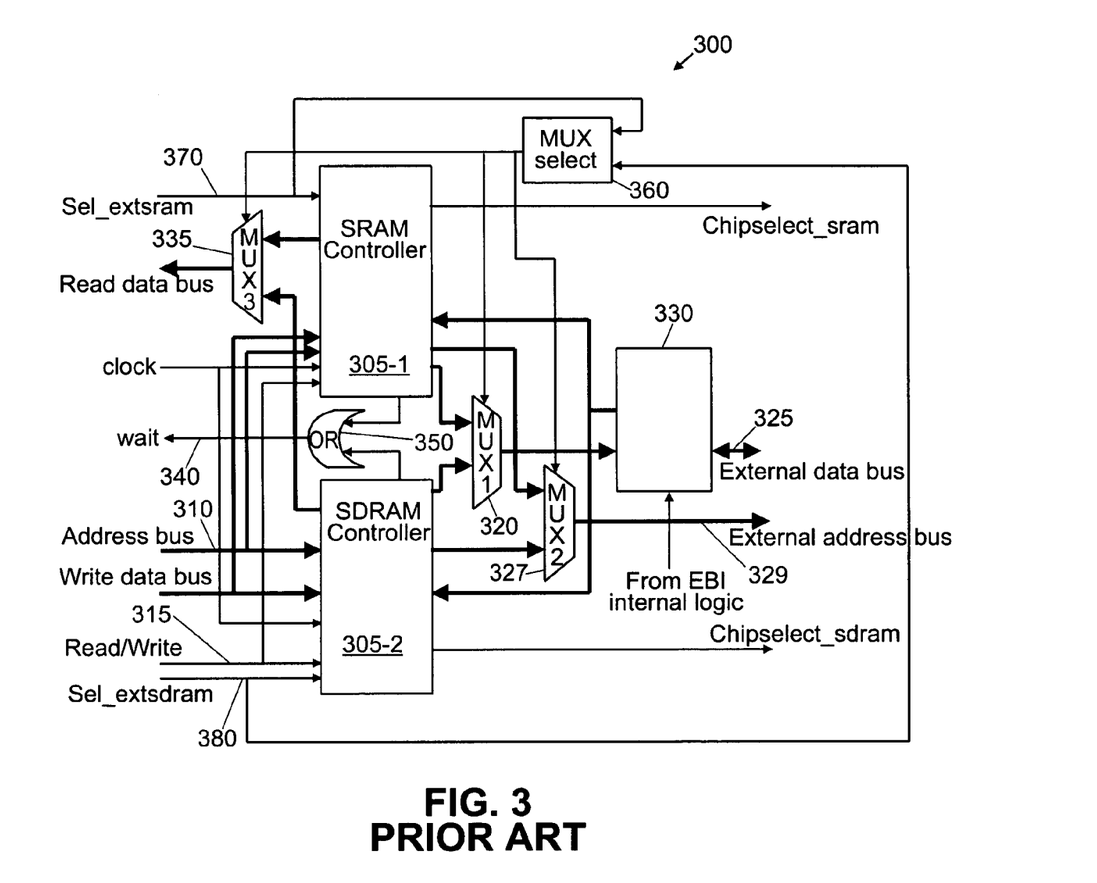
FIG. 3 is a schematic illustrating a prior art external bus circuit.

FIG. 3 is a schematic illustrating a prior art external bus circuit. External bus circuit 300 is one example of external bus circuit 230. A select signal and a read/write signal are received by either SRAM controller 305-1 or SDRAM controller 305-2.

During a memory write, controllers 305 receive an address from address bus 310, a write signal from read/write line 315, and select signals 370 and 380. Multiplexer selector 360 sends a select signal to multiplexer 320, indicating which of controllers' 305 data outputs should be selected to go to external data bus 325. Also, multiplexer selector 360 sends a select signal to multiplexer 327, indicating which of controllers' 305 address outputs should be selected to go to address bus 329. Control circuit 330 controls the direction of data flow on external data bus 325. If SRAM is being written to, then multiplexers 320 and 327 select the input from SRAM controller 305-1. If SDRAM is being written to, then multiplexers 320 and 327 select the input from SDRAM controller 305-2. The memory being selected is also sent a write signal.

During a memory read, controllers 305 receive select signals 380 and 370, an address from address bus 310 and a read signal from read/write line 315. Multiplexer selector 360 sends a select signal to multiplexer 327, indicating which of controllers' 305 address outputs should be selected to go to address bus 329. Selected memory responds and sends data to its respective controller. Multiplexer selector 360 then sends a select signal to multiplexer 335 indicating which data should be transmitted to the internal data bus.

Controllers 305 generate a wait signal to logic gate 350 when either the external memory is receiving data (memory write) or when external data bus 325 is being released from a memory read. Logic gate 350 is an OR gate that generates the wait signal along wait line 340 if either controller 305 sends a wait signal.

Figure 4:
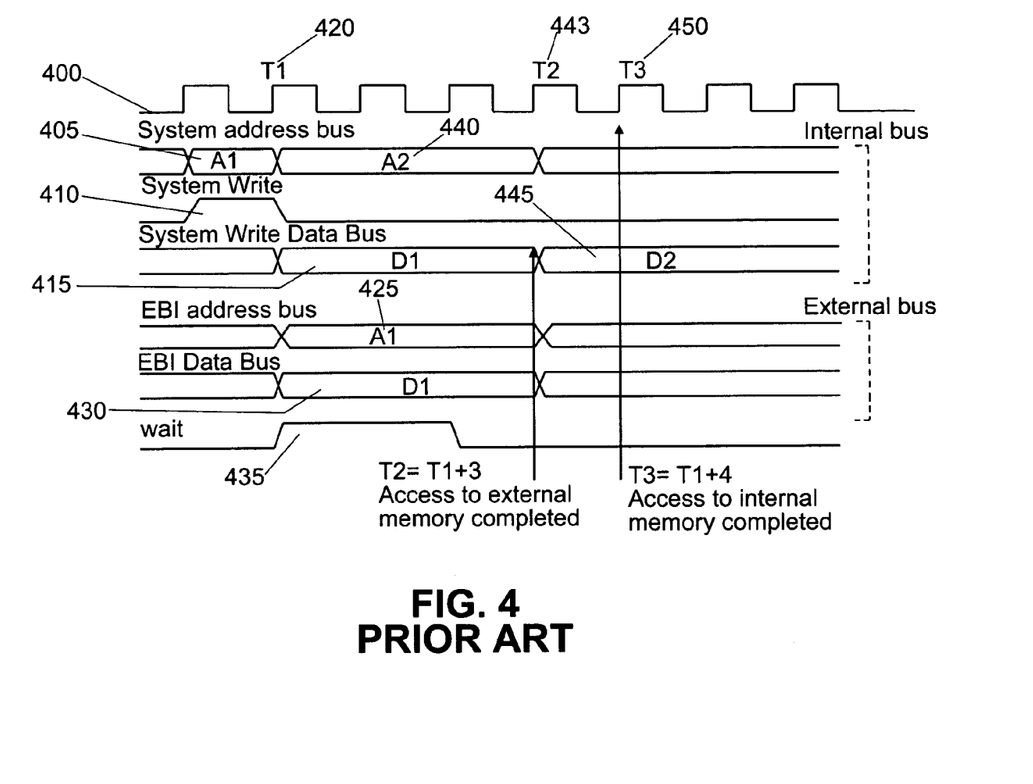
FIG. 4 is a timing diagram illustrating waveforms for a write transfer in a prior art microcontroller.

FIG. 4 is a timing diagram illustrating waveforms for a write transfer in a prior art microcontroller. The description for FIG. 4 refers to FIG. 2 as well. Clock 400 is a clock signal received by microcontroller 110, and SDRAM 130 (see FIG. 1). Address 405 is placed on address bus 210 and write signal 410 is sent on read/write line 217 to external bus circuit 230. Data 415, corresponding to address 405, is transmitted on internal data bus 216.

At time 420, address 425 is made available on address bus 234, and data 430 is made available on external data bus 238. Also, wait signal 435 is sent from external bus circuit 230 to microprocessor 202. While the external memory is being written to with the data on external data bus 238, address 440 is sent on address bus 210. However, because wait signal 435 is asserted, no access to data bus 216 is possible and data 415 continues.

Wait signal 435 is deasserted and at the end of the clock cycle, at time 443, the memory write is completed and data 415 on internal data bus 216 is replaced by data 445, corresponding to internal address 440. At time 450, access to the internal memory is completed, 4 clock cycles after address 440 becomes available.

Figure 5:
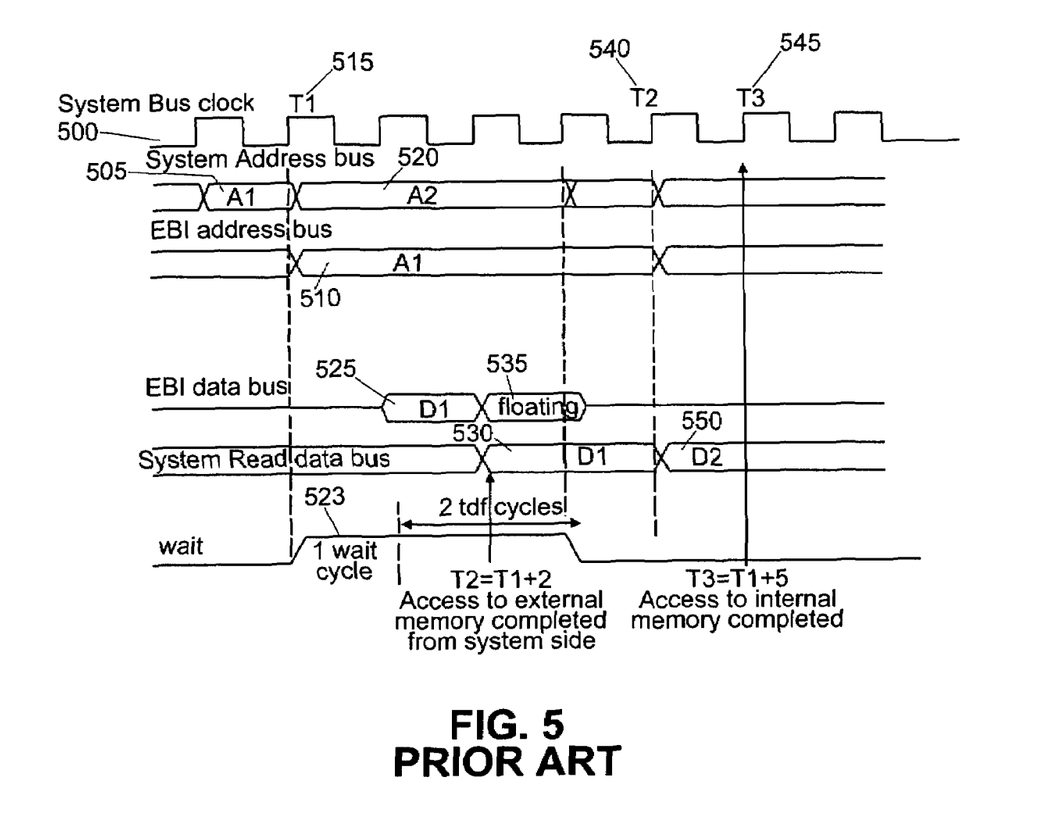
FIG. 5 is a timing diagram illustrating waveforms for a read transfer in a prior art microcontroller.

FIG. 5 is a timing diagram illustrating waveforms for a read transfer in a prior art microcontroller. The description for FIG. 5 refers to FIG. 2 as well. Clock 500 is a clock signal received by microcontroller 110, and SDRAM 130 (see FIG. 1). Address 505 is placed on address bus 210 and read signal 510 is sent on read/write line 217 to external bus circuit 230.

At time 515, external bus circuit 230 receives address 510. Also at time 515, address 520, to internal memory, is placed on address bus 210 and wait signal 523 is sent from external bus circuit 230 to microprocessor 202. Wait signal 523 ensures that microprocessor 202 will not access internal data bus 216.

After sending signals to the external memory, data 525 is transmitted on external data bus 238. After data 525 becomes available on internal data bus 216 as data 530, external data bus 238 is being released and is in floating state. When sufficient time has passed for floating state 535 to end, wait signal 523 is deasserted.

At time 540 data 530 has completed transfer to microprocessor 202 and the external memory read is complete. Also, data 550 corresponding to address 520, in the internal memory, becomes available on internal data bus 216.

At time 545, access to internal memory, at address 520, is complete, 5 clock cycles after address 505 became available.

What is needed is a method and system for reducing microprocessor inactivity time during release of the external data bus and writing to the external memory. A significant problem arises when several microprocessors access several external memories. If a single internal data bus is used, all the microprocessors are sent a wait signal and they must hold, despite their not necessarily needing the external memory.

SUMMARY OF THE INVENTION

The invention is a system for reducing inactive periods in an integrated circuit. The integrated circuit is coupled to an external peripheral by an external data bus. The integrated circuit has a processor, an address decoder coupled to the processor by an internal data bus. A busy signal is sent when the external data bus is occupied but the internal data bus is not, as well as a wait signal.

The invention is an external bus circuit coupled to the internal data bus and the external data bus. The bus interface circuit is configured to receive a read/write signal from the processor requesting read/write access to the external peripheral, and in response generate a wait signal and a busy signal. The wait signal is generated while read/write data is transferred on the internal data bus, indicating the internal data bus is not available for other purposes (i.e. until write data from processor is available in the external bus interface, or read data bus from external peripheral is available in the processor). Once the processor or the external bus circuit has received data, the external bus circuit stops generating the wait signal and generates the busy signal, the busy signal indicating that the internal bus is available and the external data bus is not available for other purposes.

The advantages of the invention include decreased processor down time due to external memory write requirements and time data float delay. The processor will be able to access the internal data bus quicker and make transfers to the internal memory faster, after an external memory access. The invention will save power and increase processing speed.

DETAILED DESCRIPTION OF THE INVENTION

Figure 6:
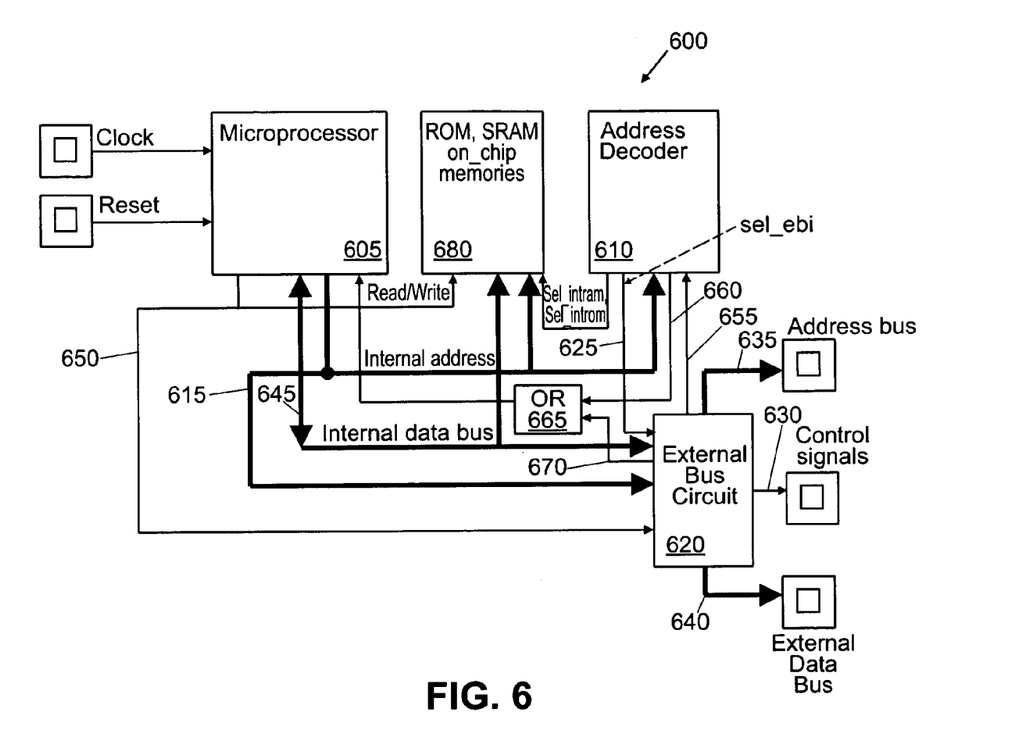
FIG. 6 is a schematic illustrating one embodiment of the invention in a microcontroller.

FIG. 6 is a schematic illustrating one embodiment of the invention in a microcontroller. Microcontroller 600 includes microprocessor 605, which sends an external memory address to address decoder 610 and external bus circuit 620 along address bus 615.

Address decoder 610 recognizes the address as external memory and sends a memory select signal along external memory select line 625 to external bus circuit 620. External bus circuit 620 receives the address and the select signal, and in response sends control signals along control line 630 and the address along address bus 635.

External memory responds and data is exchanged along external data bus 640. During an external memory write, data is sent from microprocessor 605 through internal data bus 645 to external bus circuit 620, through external data bus 640 and into the external memory. One skilled in the art will recognize that internal data bus 645 may be a single, bidirectional data bus or may represent two, unidirectional busses, one for read and one for write. Once external bus circuit 620 receives the write signal from read/write line 650, external bus circuit 620 transmits a wait signal along wait line 670, if necessary. The wait signal indicates that internal data bus 645 is engaged in the data transfer from processor 605 to the external bus circuit 620 and is not available for other purposes. As soon as wait signal 670 is released, external bus circuit 620 transmits a busy signal along busy line 655. The busy signal indicates that external data bus 640 is engaged in the data transfer from external bus circuit 620 to external peripheral and is not available for other purpose.

Address decoder 610 receives the busy signal and if the next address sent by microprocessor 605 is an external memory address or an address requiring external data bus 640 (for example, requesting a peripheral or another microprocessor), then address decoder 610 transmits a hold signal along hold signal line 660. Logic gate 665 is, in one embodiment, an OR gate that sends either the wait signal from external bus circuit 620 or the hold signal from address decoder 610. The hold signal is sent because external data bus 640 is busy with the external memory write. Microprocessor 605 receives the wait or hold signals and pauses until released from the wait or hold. The busy signal stops once external data bus 640 is disengaged, then the address decoder deasserts the hold signal and microprocessor may access external data bus 640.

If the next address sent to address decoder 610, during the busy signal, is for memory 680, an internal memory, then no hold signal is sent and microprocessor completes the access request to memory 680 with internal data bus 645.

During an external memory read, data is sent from external memory through external data bus 640 to external bus circuit 620, through internal data bus 645 and into microprocessor 605. Once external bus circuit 620 receives the read signal from read/write line 650, external bus circuit 620 transmits a wait signal along wait line 670. The wait signal indicates that external data bus 640 and internal data bus 645 are engaged and not available for other purposes.

Logic gate 665 receives the wait signal and transmits it to microprocessor 605, preventing microprocessor 605 from accessing internal data bus 645 for other purposes. External bus circuit 620 stops transmitting the wait signal to logic gate 665 as soon as the microprocessor has received the requested data from external memory, indicating that data has cleared internal bus 645. External data bus 640 must be released before microprocessor 605 may request another access to external memory. During the release period, and after the data has cleared internal data bus 645, the wait signal is released and the external bus circuit 620 sends the busy signal to address decoder 610, indicating that the external data is still in floating state.

Address decoder 610 receives the busy signal and if the next address sent by microprocessor 605 is an external memory address or an address requiring external data bus 640 (for example, requesting a peripheral or another microprocessor), then address decoder 610 transmits a hold signal along hold signal line 660. Logic gate 665 sends either the wait signal from external bus circuit 620 or the hold signal from address decoder 610. The hold signal is sent because external data bus 640 is being released and is in a floating state. The busy signal stops once external data bus 640 is released, then the address decoder deasserts the hold signal and microprocessor may access external data bus 640.

If the next address sent to address decoder 610, during the busy signal, is for memory 680, an internal memory, then no hold signal is sent from address decoder 610 and microprocessor completes the access request to memory 680 with internal data bus 645.

In summary, following an external memory write, microprocessor 605 must pause due to wait signal 670 until data being written in external bus circuit 620 and then is free to access internal data bus 645 for any internal address. Following an external memory read, microprocessor 605 must pause due to the wait signal until internal data bus 645 is clear of the data being read, and then may access internal data bus 645 for any internal address.

Figure 7:
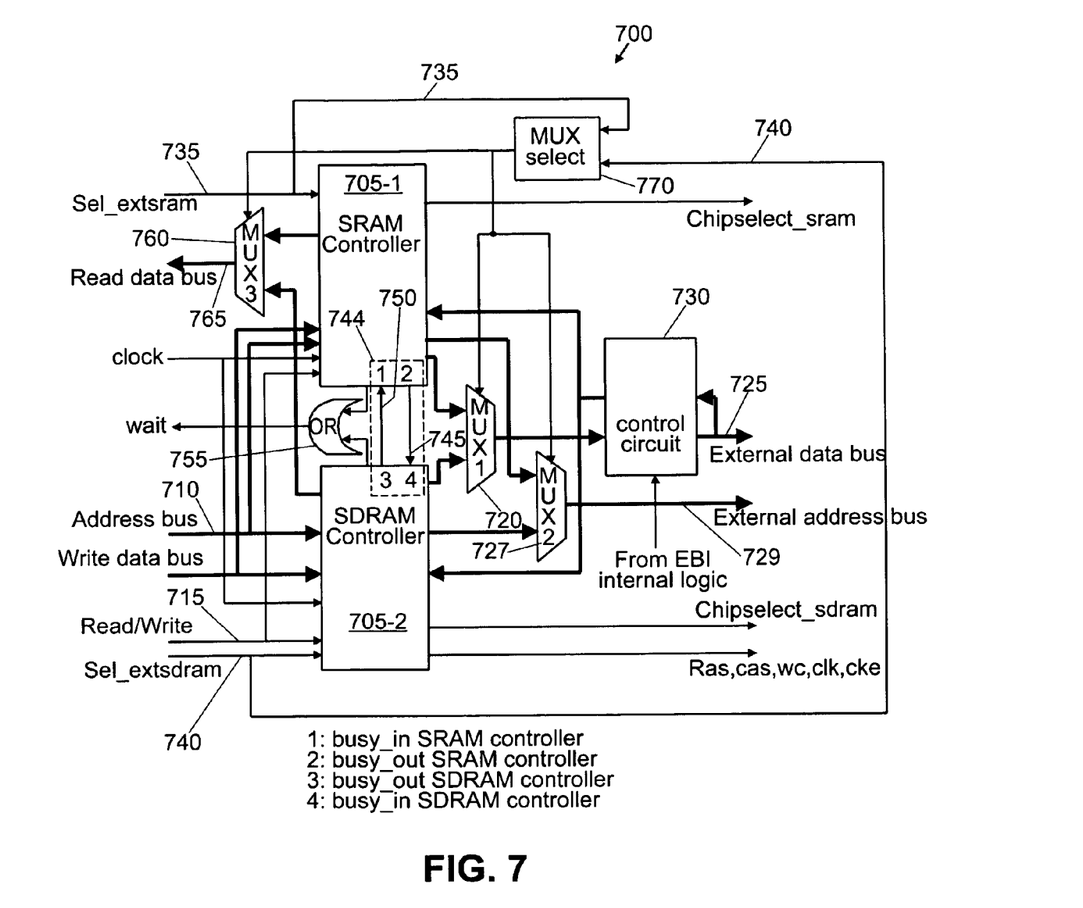
FIG. 7 is a schematic illustrating one embodiment of the invention in an external bus circuit.

FIG. 7 is a schematic illustrating one embodiment of the invention in an external bus circuit. External bus circuit 700 may replace external bus circuit 230 in FIG. 2, without sending a busy signal to the address decoder, as in FIG. 6.

During a memory write, controllers 705 receive an address from address bus 710, a select signal from select lines 735 and 740, and a write signal from read/write line 715. Multiplexer selector 770 sends a select signal to multiplexer 720, indicating which of controllers' 705 data outputs should be selected to go to external data bus 725. Also, multiplexer selector 770 sends a select signal to multiplexer 727, indicating which of controllers' 705 address outputs should be selected to go to address bus 729. Control circuit 730 controls the direction of data flow on external data bus 725. If SRAM is being written to, then multiplexers 720 and 727 select the input from SRAM controller 705-1. If SDRAM is being written to, then multiplexers 720 and 727 select the input from SDRAM controller 705-2. The memory being selected is also sent a write signal.

Once controllers 705 receive the write signal, a wait signal is generated from whichever controller received select signal 735 or 740 if the controller is not able to immediately get the data. For example, during write from microprocessor to external SRAM, controller 705-1 sends a wait signal to logic gate 755. Once the data is transferred from write data bus 780 to internal controller 705-1, controller 705-1 stops transmitting the wait signal, indicating that the internal data bus is available.

In another embodiment, block 744 contains busy out lines 745 and 750. During write to external SRAM, controller 705-1 generates a busy signal on busy out line 745 to controller 705-2. During the write to external SRAM, if controller 705-2 receives a select an external address and a busy signal on line 765, controller 705-2 sends a hold signal to logic gate 755, which sends the hold signal to the microprocessor. The hold signal indicates that the internal data bus is available, but because the next address accessed by the microprocessor was on the external data bus, the microprocessor must hold until the external data bus is finished with the last memory write.

The same applies to controller 705-2. If controller 705-2 is writing to external SRAM then controller 705-2 generates a busy signal on busy out line 750 to controller 705-1. During the external write, if controller 705-1 receives a select and an external address and busy signal on line 750, controller 705-1 sends a hold signal to logic gate 755, which sends the hold signal to the microprocessor.

During a memory read, controllers 705 receive an address from address bus 710, a select signal from select lines 735 - 740, and a read signal from read/write line 715. Multiplexer selector 770 sends a select signal to multiplexer 727, indicating which of controllers' 705 address outputs should be selected to go to address bus 729. The selected memory responds and sends data to the selected controller. Multiplexer selector 770 then sends a select signal to multiplexer 760 indicating which controller 705 will transmit to the internal data bus.

Once controllers 705 receive the read signal, a wait signal is generated from whichever controller received a select signal. For example, during read from external SDRAM, controller 705-2 sends a wait signal to logic gate 755. Once the data to be read is transferred from external data bus 725 to internal data bus 765, controller 705-2 stops transmitting the wait signal, indicating that the internal data bus is available.

Then, controller 705-2 generates a busy signal and transmits it to controller 705-1. The busy signal continues until external data bus 725 is fully released. During that time, if controller 705-1 is accessed for external memory then controller 705-1 generates a hold signal to logic gate 755, which transmits the hold to the microprocessor, indicating that the internal data bus is available, but the external data bus cannot be used until the busy signal ceases.

Although "busy" and "wait" signals are referred to as being different in this embodiment, they may represent different signals or the same signal being transmitted on the same line. The difference has been emphasized for the time at which the signals are transmitted and their effect. A wait signal is transmitted when the internal data bus is engaged, while a busy signal is maintained while the internal data bus is available but the external data bus is not. A wait signal is received by the microprocessor in some form, causing a pause in further processing, while a busy signal is withheld from the microprocessor.

Figure 8:
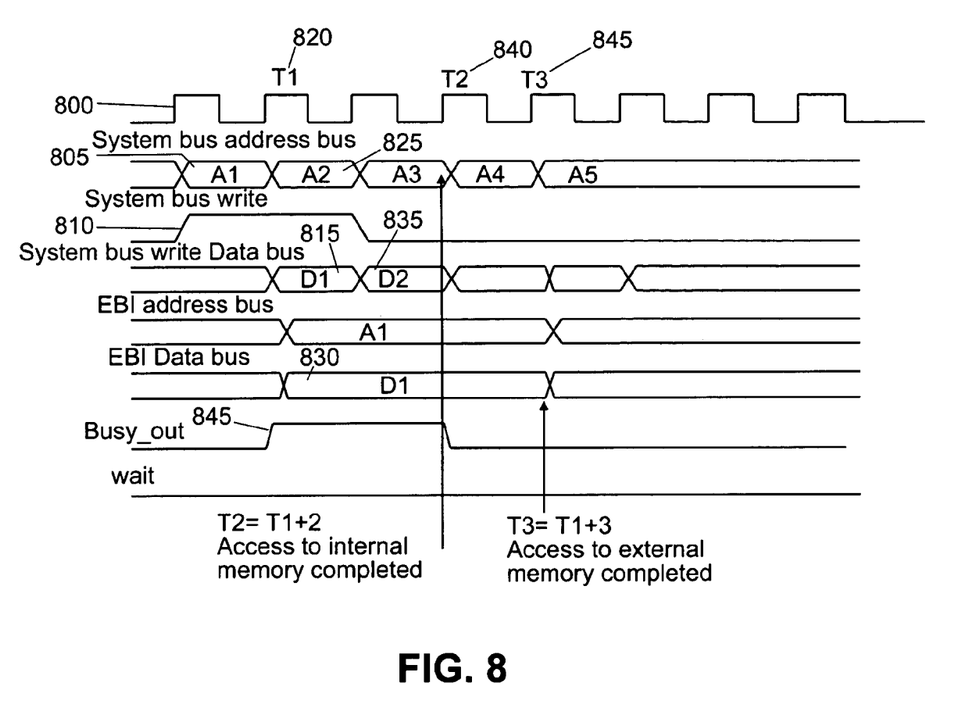
FIG. 8 is a timing diagram illustrating waveforms for a write transfer in one embodiment of the invention.

FIG. 8 is a timing diagram illustrating waveforms for a write transfer in one embodiment of the invention. The description for FIG. 8 refers to FIG. 6 as well, however the timing diagram is applicable to all embodiments and is not limited to the embodiment in FIG. 6. Clock 800 is a clock signal received by microcontroller 110, and SDRAM 130 (see FIG. 1). Address 805 is placed on address bus 615 and write signal 810 is sent on read/write line 650 to external bus circuit 620. Data 815, corresponding to address 805, is transmitted on internal data bus 645.

At time 820, address 825 to internal memory 680 is made available on address bus 615, and data 830 is made available on external data bus 640. Busy signal 845 is generated, indicating that no other access to external data bus 640 is possible. In this example, no wait signal is generated during external memory write. While the external memory is being written to with the data on external data bus 640, address 825 is sent on address bus 615. Because no wait signal is asserted, data 835 is transmitted on internal data bus 645 to memory 680.

At time 840, access to memory 680 is complete, and busy signal 845 ends. At time 845, access to external memory ends. At time 840, access to the internal memory is completed, 2 clock cycles after address 825 to internal memory was available, and 2 clock cycles faster than in the prior art. The busy signal ending typically occurs one clock cycle in advance of the availability of the external data bus.

Between time 820 and 840, while busy signal 845 is generated, access to external data bus 640 is prohibited.

Figure 9:
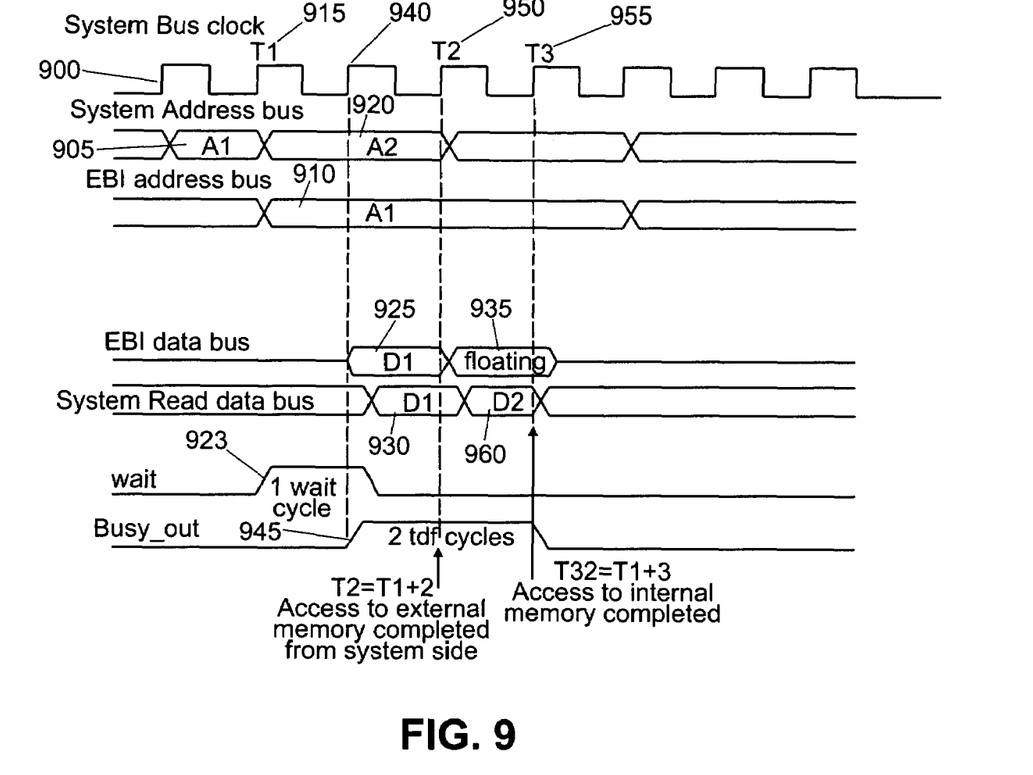
FIG. 9 is a timing diagram illustrating waveforms for a read transfer in one embodiment of the invention.

FIG. 9 is a timing diagram illustrating waveforms for a read transfer in one embodiment of the invention. The description for FIG. 9 refers to FIG. 6 as well, however the timing diagram is applicable to all embodiments and is not limited to the embodiment in FIG. 6. Clock 900 is a clock signal received by microcontroller 110, and SDRAM 130 (see FIG. 1). Address 905 is placed on address bus 615 and a read signal is sent on read/write line 650 to external bus circuit 620.

At time 915, external bus circuit 620 receives address 910. Also at time 915, address 920, to internal memory, is placed on address bus 615 and wait signal 923 is sent from external bus circuit 620 to microprocessor 605. Wait signal 923 ensures that microprocessor 605 will not access internal data bus 645.

At time 940, address 920 is held at microprocessor 605 because of wait signal 923, and data 925 becomes available on external data bus 640. Shortly after becoming available on external data bus 640, data 930 becomes available on internal data bus 645 and is received by microprocessor 605. Wait signal 923 ends and busy signal 945 is generated, also at approximately time 940.

At time 950, address 920 is taken off address bus 615 and data 925 is removed from external data bus 640. External data bus 640 enters time data float 935, as it is being released. Shortly after time 950, data 960, corresponding to address 920, is made available on internal data bus 645.

At time 955, busy signal 945 ends. By time 955, external memory read is complete and one internal memory read is complete, 3 clock cycles after address 905. The invention decreases the access time for an internal memory access following an external memory read by 2 clock cycles.

Between time 915 and time 940, while wait signal 923 is generated, no access to internal data bus 645 is permitted. Between time 940 and 955, while busy signal 945 is generated, access to internal data bus 645 may be permitted and access to external data bus 640 is denied. After time 955, access to internal or external busses is permitted.

Figure 10:
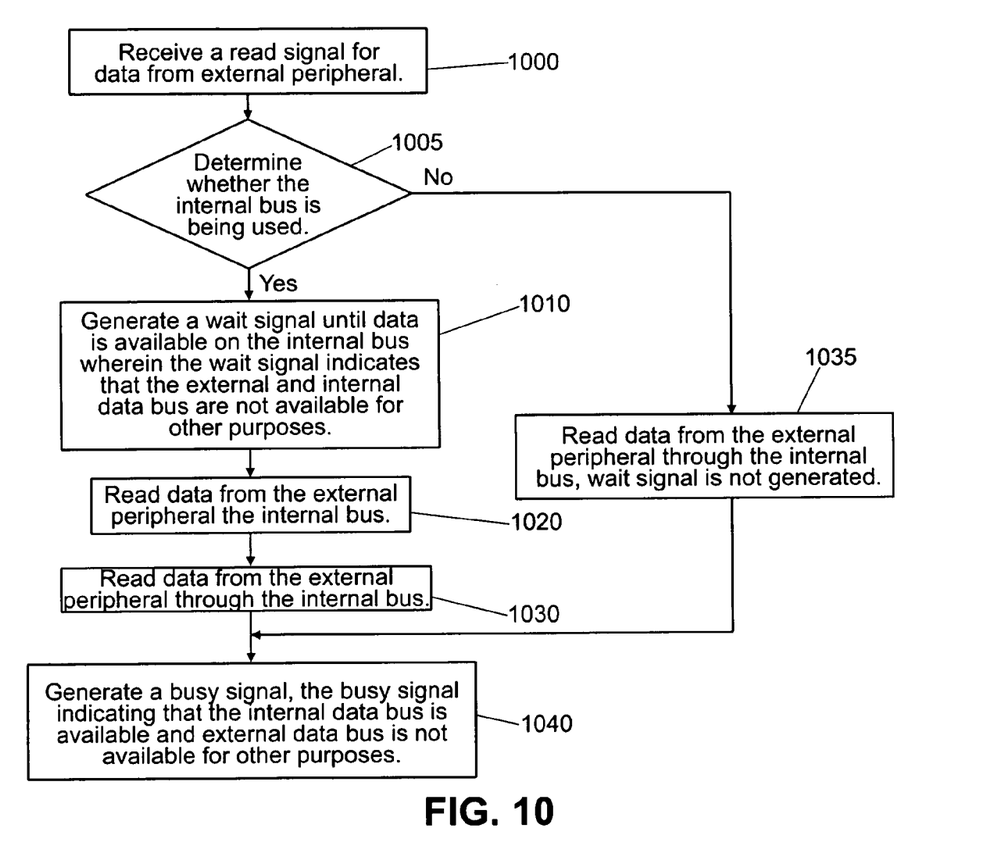
FIG. 10 is a flow diagram illustrating one method of reducing inactive periods in an integrated circuit.

FIG. 10 is a flow diagram illustrating one method of reducing inactive periods in an integrated circuit coupled to an external peripheral by an external data bus. The integrated circuit has a processor, an address decoder coupled to the processor by an internal data bus, an external bus circuit coupled to the internal data bus and the external data bus. In block 1000, receive a read signal for data from the external peripheral. In block 1005, if the external peripheral can immediately answer. In block 1010, if the external peripheral cannot immediately answer, generate a wait signal until data from the external peripheral is available on the internal data bus wherein the wait signal indicates that the external and internal data busses are not available for other purposes, then stop generating the wait signal. In block 1020, read data from the external peripheral through the internal data bus. In block 1030, stop generating the wait signal. In block 1035, if the external peripheral can immediately answer, read data from the external peripheral through the internal bus. In block 1040, generate a busy signal, the busy signal indicating that the internal data bus is available and the external data bus is not available for other purposes.

Figure 11:
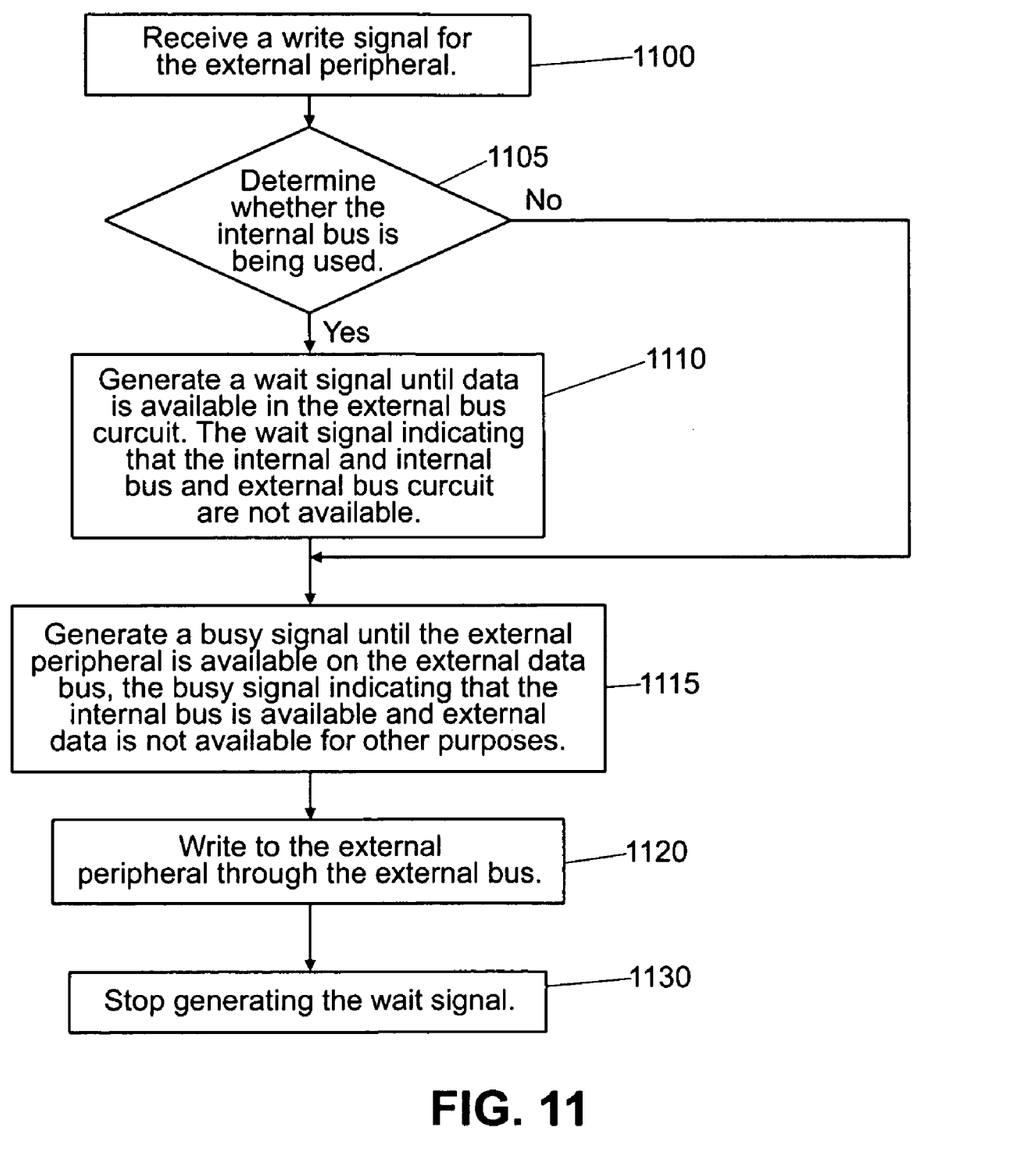
FIG. 11 is a flow diagram illustrating another method of reducing inactive periods in an integrated circuit.

FIG. 11 is a flow diagram illustrating another method for reducing inactive periods in an integrated circuit coupled to an external peripheral by an external data bus. The integrated circuit has a processor, an address decoder coupled to the processor by an internal data bus, and an external bus circuit coupled to the internal data bus and the external data bus. In block 1100, receive a write signal for the external peripheral. In block 1105, determine whether the external bus circuit can immediately answer. In block 1110, if the external bus circuit can not immediately answer, generate a wait signal until data is available in the external bus interface. The wait signal indicating that the internal bus and external bus are not available. In block 1115, generate a busy signal until the external peripheral is available on the external data bus, the busy signal indicating that the internal data bus is available and the external data bus is not available for other purposes. In block 1120, write to the external peripheral through the external data bus. In block 1130, stop generating the busy signal.

The advantages of the invention include reducing processor wait time during time data float delay and write time requirements in external memory.

One of ordinary skill will recognize that although the embodiments described herein apply to external memory, the invention may be applied to any delay of the microprocessor due to waiting on an external bus, whether the external bus is being used by a peripheral, memory, another microprocessor, etc. The invention provides a method and system for utilizing the internal data bus while the external data bus is otherwise engaged. In another embodiment, the invention may be applied to a pair of buses (either external or internal) coupled to a bridge. While one bus is busy the other bus may be utilized.

The embodiments described herein are meant to provide an enabling disclosure only and not meant as limiting features of the invention. As any person skilled in the art will recognize from the previous description and from the figures and claims that modifications and changes can be made to the invention without departing from the scope of the invention defined in the following claims.

What is claimed is:

1. A system for reducing inactive periods in an integrated circuit coupled to an external peripheral by an external data bus, the integrated circuit having a processor, an address decoder coupled to the processor by an internal data bus, the system comprising:
   an external bus circuit coupled to the internal data bus and the external data bus, the external bus circuit configured to receive a read signal requesting data from the processor and in response generate a wait signal until data from the external peripheral is available on the internal data bus, the wait signal indicating that the external and internal data bus are not available for other purposes, and after the processor has received data from the internal data bus the external bus circuit stops generating the wait signal and generates a busy signal, the busy signal indicating that the internal data bus is available and the external data bus is not available for other purpose; and
   a logic gate coupled to the address decoder and the external bus circuit, the logic gate configured to receive the wait signal from the external bus circuit, the address decoder further configured to transmit a hold signal to the logic gate if the processor requests an address located in the external peripheral, the hold signal indicating that the external data bus is not available, the logic gate configured to transmit to the processor either the wait or hold signals.

2. The system of claim 1, the external bus circuit further configured to generate the busy signal while the external data bus is floating.

3. The system of claim 1, wherein the external bus circuit is further configured to receive a write signal requesting access to write data in the external peripheral and in response generate the busy signal until the external peripheral is available to receive data, and after the processor has received access to the peripheral through the external data bus the external bus circuit stops generating the busy signal.

4. The system of claim 3, further comprising:
   a logic gate coupled to the address decoder and the external bus circuit, the logic gate configured to receive the wait signal from the external bus circuit, the address decoder further configured to transmit a hold signal to the logic gate if the processor requests an address located in the external peripheral and the address decoder receives the busy signal, the hold signal indicating that the external data bus is not available, the logic gate configured to transmit to the processor either the wait or hold signals.

5. The system of claim 4 wherein the external peripheral is an external memory.

6. The system of claim 5 wherein the external bus circuit is a static random access memory (SRAM) controller.

7. The system of claim 5 wherein the external bus circuit is a flash memory controller.

8. The system of claim 5 wherein the external bus circuit is a burst flash memory controller.

9. The system of claim 5 wherein the external bus circuit is a synchronous dynamic random access memory (SDRAM) controller.

10. The system of claim 5 wherein the external bus circuit is a double data rate memory controller.

11. The system of claim 5 wherein the external bus circuit is a reduced latency dynamic random access memory (RAM) controller.

12. A system for reducing inactive periods in an integrated circuit coupled to an external peripheral by an external data bus, the integrated circuit having a processor, an address decoder coupled to the processor by an internal data bus, the system comprising:
   an external bus circuit coupled to the internal data bus and the external data bus, the external bus circuit configured to receive a write signal requesting access to the external peripheral and in response generate a wait signal until data is available in the external bus circuit, indicating that the internal bus and external bus circuit are not available, and generate a busy signal until the external peripheral is available on the external data bus, the busy signal indicating that the internal data bus is available and the external data bus is not available for other purposes; and
   a logic gate coupled to the address decoder and the external bus circuit, the logic gate configured to receive the wait signal from the external bus circuit, the address decoder further configured to transmit a hold signal to the logic gate if the processor requests an address located in the external peripheral and the address decoder receives the busy signal, the hold signal indicating that the external data bus is not available, the logic gate configured to transmit to the processor either the wait or hold signals.

13. The system of claim 12 wherein the external bus circuit is further configured to stop transmitting the busy signal after the processor has received access to the peripheral through the external data bus.

14. A method for reducing inactive periods in an integrated circuit coupled to an external peripheral by an external data bus, the integrated circuit having a processor, an address decoder coupled to the processor by an internal data bus, an external bus circuit coupled to the internal data bus and the external data bus and a logic gate coupled to the address decoder and the external bus circuit, the method comprising:

receiving a read signal for data from the external peripheral;

generating a wait signal until data from the external peripheral is available on the internal data bus, wherein the wait signal indicates that the external and internal data busses are not available for other purposes;

reading data from the external peripheral through the internal data bus; stopping generation of the wait signal;

generating a busy signal, the busy signal indicating that the internal data bus is available and the external data bus is not available for other purposes;

receiving the busy signal in the address decoder;

identifying an address corresponding to the external data bus;

transmitting a hold signal from the address decoder to the logic gate, the hold signal indicating that the external data bus is not available; and     passing the hold signal from the logic gate to the processor.

15. The method of claim 14, further comprising:

receiving the wait signal at the logic gate; and passing the wait signal from the logic gate to the processor.

16. A method for reducing inactive periods in a integrated circuit coupled to an external peripheral by an external data bus, the integrated circuit having a processor, an address decoder coupled to the processor by an internal data bus, an external bus circuit coupled to the internal data bus and the external data bus and a logic gate coupled to the address decoder and the external bus circuit, the method comprising:

receiving a write signal for the external peripheral;

generating a wait signal until data is available on the external bus circuit, the wait signal indicating that the internal data bus and the external bus circuit are not available;

generating a busy signal until the external peripheral is available on the external data bus, the busy signal indicating that the internal data bus is available and the external data bus is not available for other purposes;

writing to the external peripheral through the external data bus;

stopping generation of the busy signal;

receiving the busy signal in the address decoder;

identifying an address corresponding to the external data bus;

transmitting a hold signal from the address decoder to the logic gate, the hold signal indicating that the external data bus is not available; and     passing the hold signal from the logic gate to the processor.

17. The method of claim 16 further comprising:

receiving the wait signal at the logic gate; and passing the wait signal from the logic gate to the processor.

\* \* \* \* \*